US006690924B1

(12) United States Patent
Jan et al.

(10) Patent No.: US 6,690,924 B1
(45) Date of Patent: Feb. 10, 2004

(54) CIRCULAR POLARIZATION ANTENNA FOR WIRELESS COMMUNICATIONS

(75) Inventors: Chengen Jan, Hsin-Chu Hsien (TW); Weili Cheng, Taipei (TW)

(73) Assignee: Acer Neweb Corporation (TW)

(*) Notice: Subject to any disclaimer, the term of this patent is extended or adjusted under 35 U.S.C. 154(b) by 0 days.

(21) Appl. No.: 09/521,678

(22) Filed: Mar. 8, 2000

(30) Foreign Application Priority Data

Nov. 8, 1999 (TW) ....................................... 88119693 A

(51) Int. Cl.[7] .............................. H04B 1/00; H01Q 1/52

(52) U.S. Cl. ....................... 455/90.3; 343/428; 343/851; 455/575.5; 455/63.4

(58) Field of Search ................................. 455/300, 301, 455/550, 575, 90, 575.5, 90.3, 63.4; 361/799, 800, 816, 818; 343/725, 867, 742, 726, 728, 851, 853, 741, 866, 727

(56) References Cited

U.S. PATENT DOCUMENTS 5,337,065 A * 8/1994 Bonnet et al. ....... 343/700 MS
5,784,032 A * 7/1998 Johnston et al. ............ 343/702
6,057,803 A * 5/2000 Kane et al. ................. 343/713
6,133,879 A * 10/2000 Grangeat et al. .... 343/700 MS
6,147,648 A * 11/2000 Granholm et al. ... 343/700 MS
6,184,833 B1 * 2/2001 Tran .................... 343/700 MS
6,343,208 B1 * 1/2002 Ying .......................... 343/702
6,344,823 B1 * 2/2002 Deng .......................... 29/600
6,346,913 B1 * 2/2002 Chang et al. ........ 343/700 MS
6,369,603 B1 * 4/2002 Johnston et al. ............ 324/750

* cited by examiner

*Primary Examiner*—Sinh Tran
*Assistant Examiner*—S. Smith
(74) *Attorney, Agent, or Firm*—Michael D. Bednarek; Shaw Pittman LLP

(57) ABSTRACT

An apparatus for wireless data communications is provided. The apparatus comprises a substrate, a microstrip line of a quarter-wavelength, a contact pad, an impedance transformer of the quarter-wavelength, a ground plane, a loop antenna of the quarter-wavelength and a monopole antenna of the quarter-wavelength. The substrate has a first surface and a second surface opposite to the first surface. The microstrip line, the contact pad, the impedance transformer are formed on the first surface of the substrate. Both the ground plane and the loop antenna are formed on the second surface. The loop antenna is configured with one end connected to the ground plane, and another end overlapped with the microstrip line and spaced from the ground plane. The monopole antenna is attached to the contact pad.

20 Claims, 5 Drawing Sheets

CIRCULAR POLARIZATION ANTENNA FOR WIRELESS COMMUNICATIONS

BACKGROUND OF THE INVENTION

1. Field of the Invention

The present invention generally relates to an antenna for wireless data communications. More particularly, the present invention relates to an antenna for providing omni-directional radiation pattern and circular polarization.

2. Description of the Related Art

Typically, desktop computers, notebook computers, palmtop computers, or personal digital assistants communicate with a host computer system for data communications via wiring hardware, such as coaxial cables or twisted-pair cables. However, for avoiding drawbacks of hardware cabling, wireless communications have been gradually applied to the computer system for transmitting or receiving data.

With respect to wireless data communications, antennas play an important role for transmitting and receiving electromagnetic waves in any direction. Usually, the antennas utilized thereby should be provided with omni-directional radiation pattern in the azimuth direction, but null in the top direction. Therefore, a rod-like antenna, such as a dipole antenna, is considered to be suitable for transmitting and receiving vertically polarized waves and thus widely applied to the communication devices nowadays.

In a wireless communication system, data signals may be reflected from many surrounding objects so that the reflected waves may combine with the data signals in a constructive or destructive manner. However, though the dipole antenna can be employed to receive and transmit the vertically polarized waves, multi-path interference, diffraction or reflection occurring in surroundings may change the vertically polarized waves in phase for long-distance communications. Even worse, data signals may be altered from the vertically polarized waves to horizontally polarized waves that can not be received by the dipole antenna thereby causing data loss. Thus, there is a need to provide an antenna that can process the vertically polarized waves and the horizontally polarized waves as well.

SUMMARY OF THE INVENTION

Therefore, it is an object of the present invention to provide a circular polarization antenna for wireless data communications. The circular polarization antenna is provided with a horizontal polarization loop antenna and a vertical polarization monopole antenna resonating together to form omni-directional radiation patterns in the azimuth direction but null pattern in the top direction for receiving or transmitting circularly polarized electromagnetic waves.

For achieving the aforementioned object, the present invention provides an apparatus for wireless data communications, which comprises a substrate, a microstrip line of a quarter-wavelength, a contact pad, an impedance transformer of the quarter-wavelength, a ground plane, a loop antenna of the quarter-wavelength and a monopole antenna of the quarter-wavelength. The substrate has a first surface and a second surface opposite to the first surface. The microstrip line, the contact pad, the impedance transformer are formed on the first surface of the substrate. Both the ground plane and the loop antenna are formed on the second surface. The loop antenna is configured with one end connected to the ground plane, and another end overlapped with the microstrip line and spaced from the ground plane. The monopole antenna is attached to the contact pad.

Moreover, the present invention provides an apparatus for wireless data communications, which comprises a substrate, a first conductive layer and a second conductive formed on opposite surfaces of the substrate, and a monopole antenna. The first conductive layer has a microstrip line, a contact pad and an impedance transformer connected in series, and the second conductive layer has a ground plane and a loop antenna. The loop antenna has one end connected to the ground plane, and another end overlapped with the microstrip line and spaced from the ground plane. The monopole antenna is attached to the contact pad.

Furthermore, an apparatus is provided for processing an electromagnetic signals having horizontally polarized waves and vertically polarized waves, which comprises a loop antenna of a quarter-wavelength formed on a substrate to receive the horizontally polarized waves, and a monopole antenna of the quarter-wavelength secured to the substrate to receive the vertically polarized waves.

BRIEF DESCRIPTION OF DRAWINGS

The following detailed description, given by way of examples and not intended to limit the invention to the embodiments described herein, will best be understood in conjunction with the accompanying drawings, in which.

DETAILED DESCRIPTION OF THE INVENTION

Figure 1A:
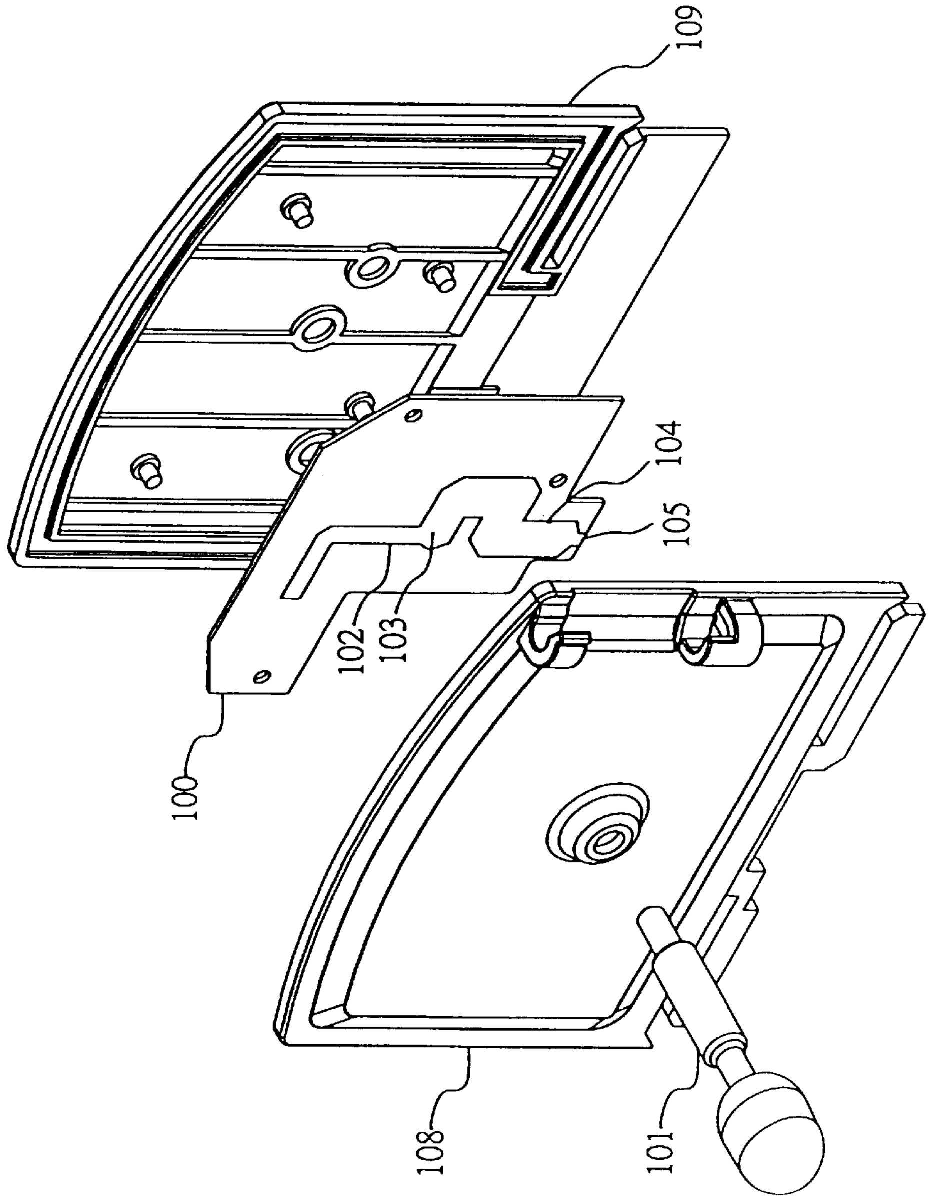
FIG. 1A depicts a circular polarization antenna of one preferred embodiment in accordance with the present invention in a top-to-down perspective view.
Figure 1B:
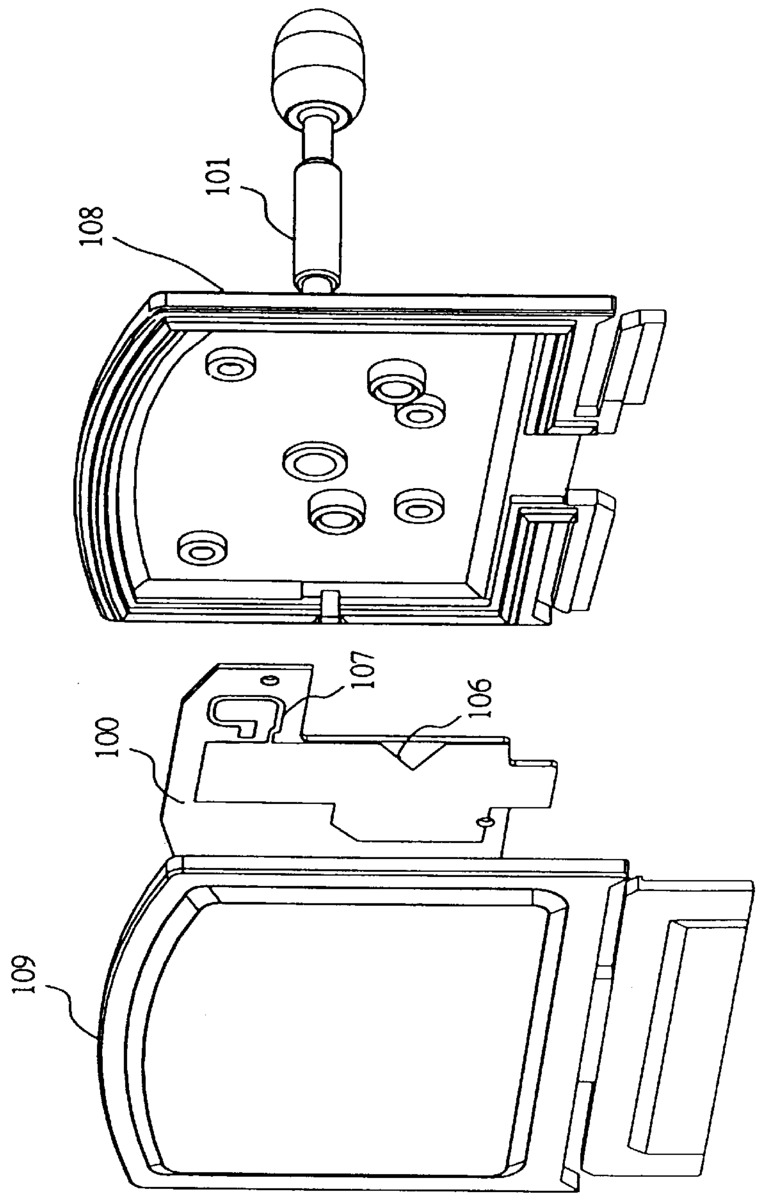
FIG. 1B depicts the circular polarization antenna of FIG. 1A in a down-to-top perspective view.

Referring to FIGS. 1A and 1B, a circular polarization antenna of one preferred embodiment in accordance with the present invention are illustrated in a top-to-down perspective view and in a down-to-top perspective view, respectively. The circular polarization antenna has a substrate 100 made of epoxy, epoxy glass, Teflon with glass fibers, or plastic of low dielectric loss with glass, preferably. Moreover, the circular polarization antenna comprises a quarter-wavelength monopole antenna 101, a quarter-wavelength microstrip line 102, a contact pad 103, a quarter-wavelength impedance transformer 104, a microstrip line 105, a ground plane 106 and a quarter-wavelength loop antenna 107.

As shown in FIGS. 1A and 1B, the quarter-wavelength microstrip line 102, the contact pad 103, the quarter-wavelength impedance transformer 104, the microstrip line 105 are formed on the top surface of the substrate 100, where the ground plane 106 and the quarter-wavelength loop antenna 107 are formed on the opposite surface of the substrate 100. The monopole antenna 101 is electrically connected with the contact 103 via a hole formed in an upper plate casing 108. Preferably, the monopole antenna 101 is vertically secured to the upper plate casing 108. The upper plate casing 108 is used to engage with a lower plate casing 109 to protect the microstrip lines 102 and 105, the contact pad 103, the impedance transformer 104, the ground plane 106 and the loop antenna 107 while the substrate 100 is placed therein. As an example, the microstrip line 102 has a resistance lower than 50 ohms.

If the circular polarization antenna of the present invention is desired to be integrated with a motherboard, the microstrip line 105 can be coupled to an interface, such as PCMCIA, ISA, or USB interface, in a computer system. However, the interface is design choice based upon different applications, but not intended to limit the scope of the present invention. In addition, RF coaxial cables can be employed to connect the circular polarization antenna with the ISA interface or the USB interface.

Figure 2:
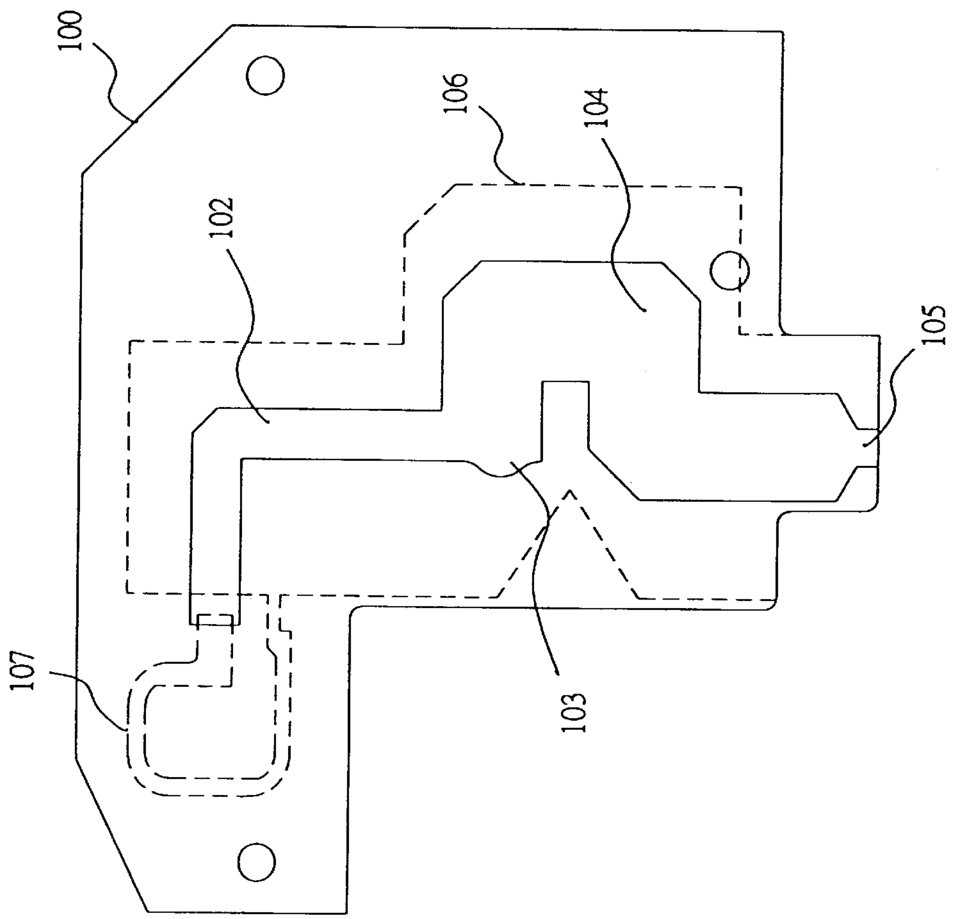
FIG. 2 is a detailed diagram illustrating layers formed on the substrate of FIGS. 1A and 1B.

Referring to FIG. 2, a detailed diagram illustrates layers formed on the substrate 100 of FIGS. 1A and 1B, wherein the solid line represents a first conductive layer formed on the top surface of the substrate 100, and the dash line represents a second conductive layer formed on the opposite surface of the substrate 100. In the drawing, the first conductive layer includes the microstrip line 102, the contact pad 103, the impedance transformer 104 and the microstrip line 105, where the second conductive layer includes the ground plane 106 and the loop antenna 107. The microstrip line 102 connects with the contact pad 103, where the loop antenna 107 has one end connected to the ground plane 106 and another end overlapped with the microstrip line 102 by the substrate 100. The overlap is designated as L1 in length and the spacing between the ground plane 106 and the loop antenna 107 is designated as L2. the impedance transformer 104 is electrically connected between the contact pad 103 and the microstrip line 105.

While receiving or transmitting the circularly polarized waves, there are two concerns: one is the resonance between the monopole antenna 101 and the loop antenna 107, the other is the impedance match between the microstrip lines 105 and 102.

With respect to the resonance between the monopole antenna 101 and the loop antenna 107, a capacitor should be provided between the loop antenna 107 and the microstrip line 102. Preferably, the capacitor has a capacitance of several pico-farads. However, if discrete components are employed to mount on the circuit board by soldering, several discrete capacitors connected in series are required for providing such a small capacitance, but not a cost-effective approach. According to the present invention, the loop antenna 107 and the microstrip line 102 are formed on the opposite sides of the substrate 100 and overlapped at a portion, and the loop antenna 107 is spaced from the ground plane 106 by a predetermined distance so as to establish the distributed capacitances for the purpose of resonance.

Figure 3B:
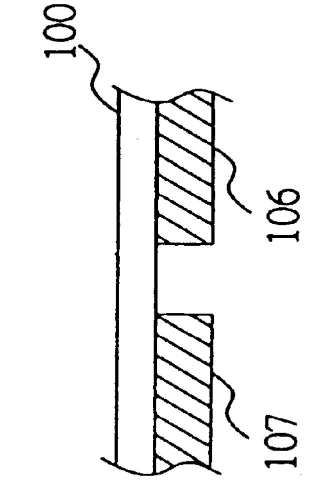
FIG. 3B depicts a second distributed capacitance in a cross-sectional view.
Figure 3A:
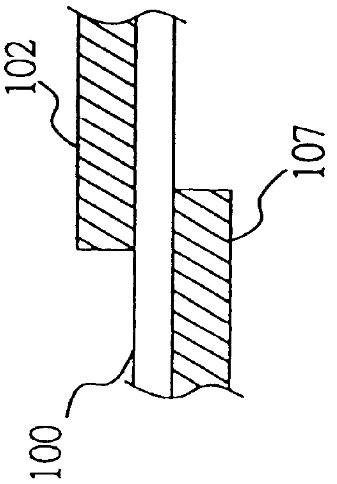
FIG. 3A depicts a first distributed capacitance in a cross-sectional view.

Referring to FIG. 3A, a first distributed capacitance C1 constituted by the overlap region between the loop antenna 107 and the microstrip line 102, both formed on the opposite surfaces of the substrate 100 and spaced by the distance L1, is depicted in a cross-sectional view. Referring to FIG. 3B, a second distributed capacitance C2 constituted by the loop antenna 107 and the ground plane 106, spaced by the distance L2, is depicted in a cross-sectional view.

The first distributed capacitance C1 is provided for energy coupling between the opposite surfaces of the substrate 100. The second distributed capacitance C2 is provided for energy coupling at one side of the substrate 100. Because the distributed capacitance C1 is connected in series to the distributed capacitance C2 in view of the microstrip line 102, the frequency bandwidth of the loop antenna 107 can be further increased.

Another requirement regarding whether the monopole antenna 101 resonates with the loop antenna 107 is that the microstrip line 102 should have a length of quarter-wavelength. Accordingly, when the electromagnetic waves are transmitted from the monopole antenna 101 to the loop antenna 107, or vice versa, their phases will be altered by 180 degrees. Thus, the electromagnetic waves bouncing forth and back between the monopole antenna 101 and the loop antenna 107 may form standing waves so that the vertically polarized waves generated by the monopole antenna 101 can resonate with the horizontally polarized waves generated by the loop antenna 107.

The impedance transformer 104 is employed to achieve the impedance match. In view of the contact pad 103, the impedance transformer 104 is used to transform the impedance constituted by the monopole antenna 101, the microstrip line 102 and the loop antenna 107, to be matched with that of the microstrip line 105. Typically, the impedance of the microstrip line 105 is about 50 Ohms or 75 Ohms. Therefore, the impedance transformer 104 facilitates the transmission and reception of the electromagnetic waves with reduced reflection and loss as well.

Accordingly, under the situation that the monopole antenna 101 can resonates with the loop antenna 107 and the impedance match is achieved, the monopole antenna 101 of the vertical polarization and the loop antenna 107 of horizontal polarization results in the effect of circular polarization as a whole.

Figure 4:
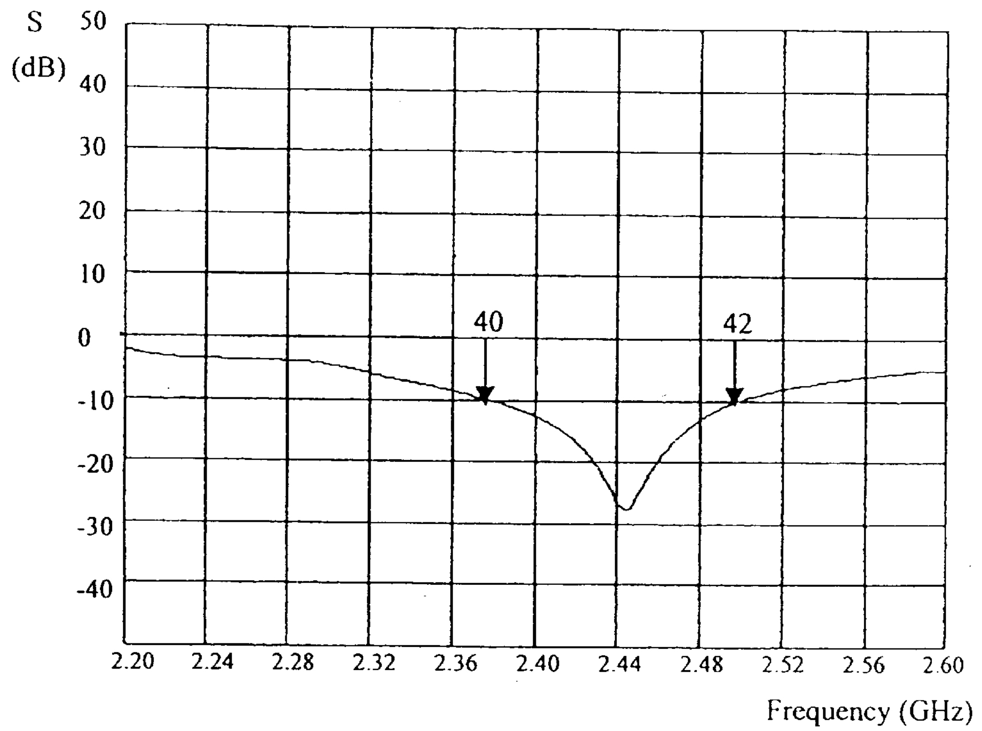
FIG. 4 is a diagram illustrating the return loss spectrum of the loop antenna of FIGS. 1A and 1B without an impedance transformer.

Referring to FIG. 4, a diagram showing the return loss spectrum of the loop antenna of FIGS. 1A and 1B, without quarter-wavelength impedance transformer is illustrated. In FIG. 4, X-axis designates a frequency range of 2.2~2.6 GHz and the Y-axis designates reflection S-parameter. The antenna-under-test merely comprises the loop antenna 107, the first distributed capacitance C1 and the second distributed capacitance C2, but lack of the monopole antenna 101 and the impedance transformer 104. As shown in FIG. 4, the less the reflection, the less the loss so that the signals are further inclined to be transmitted and received. Arrows 40 and 42 are directed to the frequencies of refection S-parameters corresponding to −10 dB, between which is designated as the bandwidth. In FIG. 4, the arrows 40 and 42 are associated with 2.38 MHz and 2.50 MHz, respectively, therefore, the bandwidth is about 120 MHz, being almost twice that (e.g., 40~50 MHz) of conventional antenna by merely using the first distributed capacitance C1.

Figure 5:
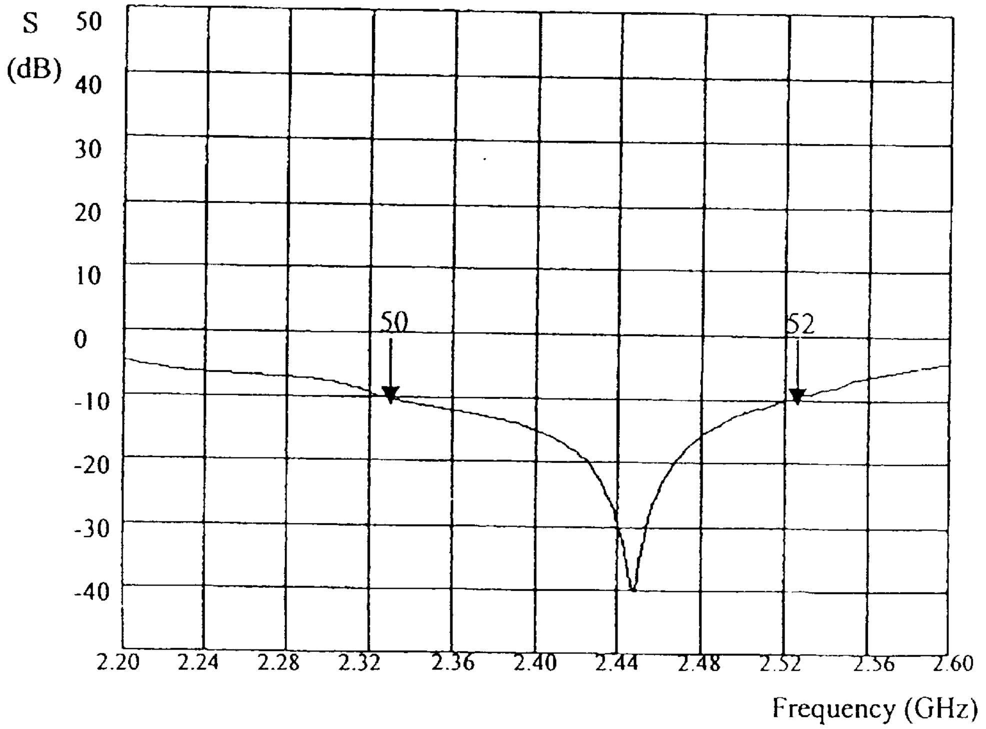
FIG. 5 is a diagram illustrating the return loss spectrum of the circular polarization antenna as shown in FIGS. 1A and 1B.

Referring to FIG. 5, a diagram showing the return loss spectrum of the circular polarization antenna of the present invention as shown in FIGS. 1A and 1B. In FIG. 5, arrows 50 and 52 direct to the frequencies of refection S-parameters corresponding to −10 dB, between which is designated as the bandwidth. In FIG. 5, the arrows 50 and 52 are associated with 2.33 MHz and 2.52 MHz, respectively, therefore, the bandwidth is further increased to about 190 MHz, being greater than that as shown in FIG. 4.

Derived from the test results of FIGS. 4 and 5, even if no monopole antenna 101 is provided, the circular polarization antenna of the present invention can also be applied for short-distance communications. However, if the monopole antenna 101 is provided, the circular polarization antenna has better performance due to resonance effect.

Furthermore, the loop antenna 107, the microstrip line 102 and the impedance transformer 104 are not limited to the layout exactly the same as shown in FIG. 2. However, it is required that that all of the loop antenna 107, the monopole antenna 101, the microstrip line 102 and the impedance transformer 104 are quarter-wavelength in length. Moreover, the monopole antenna 101 can be positioned at anywhere only if the quarter-wavelength microstrip line 102 is connected between the loop antenna 107 and the monopole antenna 101.

While the invention has been described with reference to various illustrative embodiments, the description is not intended to be construed in a limiting sense. Various modifications of the illustrative embodiments, as well as other embodiments of the invention, will be apparent to those person skilled in the art upon reference to this description. It is therefore contemplated that the appended claims will cover any such modifications or embodiments as may fall within the scope of the invention defined by the following claims and their equivalents.

What is claimed is:

1. An apparatus for wireless communications to process an electromagnetic signal having horizontally polarized waves and vertically polarized waves, comprising:

a substrate having a first surface and a second surface opposite to said first surface;

a microstrip line of a quarter-wavelength formed on said first surface;

a contact pad formed on the first surface and connected to said microstrip line;

an impedance transformer of the quarter-wavelength formed on said first surface and connected to said contact pad;

a ground plane formed on said second surface;

a loop antenna of the quarter-wavelength formed on said second surface and connected to said ground plane at one end, said loop antenna having another end overlapped with said microstrip line and spaced from said ground plane; and a monopole antenna of the quarter-wavelength attached to said contact pad, wherein the monopole antenna is directed to an orthogonal orientation with respect to a plane where the loop antenna stands to provide circularized-polarized radiation patterns in an azimuth direction.

2. The apparatus as claimed in claim 1, wherein a first distributed capacitance is established at the overlap between said loop antenna and said microstrip line.

3. The apparatus as claimed in claim 1, wherein a second distributed capacitance is established at the spacing between said loop antenna and said ground plane.

4. The apparatus as claimed in claim 1, further comprising another microstrip line formed on said first surface and connected to said impedance transformer.

5. The apparatus as claimed in claim 4, wherein said another microstrip line is coupled to an ISA interface.

6. The apparatus as claimed in claim 4, wherein said another microstrip line is coupled to a USB interface.

7. The apparatus as claimed in claim 1, wherein said another microstrip line is coupled to a PCMCIA interface.

8. The apparatus as claimed in claim 1, wherein said monopole antenna is vertically secured to said contact pad.

9. The apparatus as claimed in claim 1, wherein said microstrip line, said contact pad and said impedance transformer are integrated in a conductive layer.

10. The apparatus as claimed in claim 1, wherein said ground plane and said loop antenna are integrated in a conductive layer.

11. An apparatus for wireless communications to process an electromagnetic signal having horizontally polarized waves and vertically polarized waves, comprising:

a substrate;

a first conductive layer and a second conductive layer formed on opposite surfaces of said substrate, said first conductive layer having a microstrip line, a contact pad and an impedance transformer connected in series, said second conductive layer having a ground plane and a loop antenna, wherein said loop antenna has one end connected to said ground plane, and another end overlapped with said microstrip line and spaced from said ground plane; and a monopole antenna attached to said contact pad, wherein the monopole antenna is directed to an orthogonal orientation with respect to a plane where the loop antenna stands to provide circularized-polarized radiation patterns in an azimuth direction.

12. The apparatus as claimed in claim 11, wherein a first distributed capacitance is established at the overlap between said loop antenna and said microstrip line.

13. The apparatus as claimed in claim 11, wherein a second distributed capacitance is established at the spacing between said loop antenna and said ground plane.

14. The apparatus as claimed in claim 11, The apparatus as claimed in claim 1, wherein said microstrip line, said impedance transformer, said loop antenna and said monopole antenna are configured with quarter-wavelength.

15. The apparatus as claimed in claim 11, wherein said monopole antenna is vertically secured to said contact pad.

16. An apparatus for processing an electromagnetic signal having horizontally polarized waves and vertically polarized waves, said apparatus comprising:

a loop antenna of a quarter-wavelength formed on a substrate to receive said horizontally polarized waves; and a monopole antenna of the quarter-wavelength secured to said substrate to receive said vertically polarized waves, wherein the monopole antenna is directed to an orthogonal orientation with respect to the a plane where the loop antenna stands to provide circularized-polarized radiation patterns in an azimuth direction.

17. The apparatus as claimed in claim 16, further comprising a conductive layer formed on said substrate opposite to said loop antenna, said conductive layer having a microstrip line, a contact pad, and an impedance transformer in series.

18. The apparatus as claimed in claim 17, wherein said microstrip line is overlapped with said loop antenna to establish a distributed capacitance therebetween.

19. The apparatus as claimed in claim 16, further comprising a ground plane formed on said substrate.

20. The apparatus as claimed in claim 19, wherein said loop antenna has one end connected to said ground plane and another end spaced from said ground plane to establish a distributed capacitance therebetween.

* * * * *